(12) United States Patent
Shi et al.

(10) Patent No.: US 11,536,699 B2
(45) Date of Patent: Dec. 27, 2022

(54) ULTRASONIC PHASED ARRAY TRANSDUCER DEVICE WITH TWO-DIMENSIONAL HINGE ARRAY STRUCTURE

(71) Applicant: HARBIN INSTITUTE OF TECHNOLOGY, Harbin (CN)

(72) Inventors: Weijia Shi, Harbin (CN); Bingquan Wang, Harbin (CN); Bo Zhao, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 193 days.

(21) Appl. No.: 17/079,427

(22) Filed: Oct. 24, 2020

(65) Prior Publication Data
US 2021/0041403 A1    Feb. 11, 2021

(30) Foreign Application Priority Data
Apr. 24, 2020   (CN) .......................... 202010331110.1

(51) Int. Cl.
*G01N 29/26* (2006.01)
*G01N 29/24* (2006.01)

(52) U.S. Cl.
CPC ....... *G01N 29/262* (2013.01); *G01N 29/2487* (2013.01); *G01N 2291/106* (2013.01)

(58) Field of Classification Search
CPC .. G01N 29/262; G01N 29/34; G01N 29/2437; G01N 29/2487; G01N 2291/106;
(Continued)

(56) References Cited

U.S. PATENT DOCUMENTS 5,398,691 A * 3/1995 Martin ................ B82Y 15/00
                                                                600/463
6,517,484 B1 * 2/2003 Wilk .................. A61B 8/4209
                                                                600/443
(Continued)

FOREIGN PATENT DOCUMENTS

WO    WO2012051308    *    6/2022    ............... A61B 8/00

*Primary Examiner* — Jacques M Saint Surin
(74) *Attorney, Agent, or Firm* — IPro, PLLC

(57) ABSTRACT

An ultrasonic phased array transducer device with a two-dimensional hinge array structure belongs to equipment in the technical field of ultrasonic detection. A connecting rod is fixedly connected to a fixed support and a two-dimensional hinge array respectively. Voice coil motors are symmetrically arranged in a shape of the British "Union Jack" with the connecting rod as a center, and are fixedly connected to the fixed support. Force output rods are respectively connected to voice coil motor coils and the upper surfaces of array units. Piezoelectric array elements are fixedly connected to the lower surfaces of all the array units. The numbers of the voice coil motors and the force output rods are 2N (N=4, 8, 12, 16, 20), the number of the piezoelectric array elements is 2N+1, and different N values are selected according to the sizes of workpieces to be detected. In the disclosure, by adjusting the current of each voice coil motor coil, the corresponding force output rod generates displacement to drive the two-dimensional hinge array unit to generate displacement, so as to push out and retract the hinge array unit and the piezoelectric array element fixedly connected below and drive the two-dimensional hinge array to generate deformation, so that the piezoelectric array elements fully fit with the surface of the workpiece to be detected. The disclosure can be applied to detection of the workpieces to be detected with flat surfaces, curved surfaces or spherical surfaces.

2 Claims, 2 Drawing Sheets

(58) Field of Classification Search
CPC .......... G01N 2291/2638; B06B 1/0607; B06B 1/0622; G10K 11/346
USPC ........................................................ 73/625
See application file for complete search history.

(56) References Cited

U.S. PATENT DOCUMENTS

| | | | | |
|---|---|---|---|---|
| 6,679,849 | B2* | 1/2004 | Miller | G01S 7/52061 |
| | | | | 600/463 |
| 7,063,666 | B2* | 6/2006 | Weng | A61N 7/02 |
| | | | | 600/459 |
| 7,521,840 | B2* | 4/2009 | Heim | H01L 41/0986 |
| | | | | 310/330 |
| 7,878,977 | B2* | 2/2011 | Mo | A61B 8/445 |
| | | | | 600/467 |
| 8,183,739 | B2* | 5/2012 | Heim | H02N 1/002 |
| | | | | 310/322 |
| 10,145,424 | B2* | 12/2018 | Klassen | H02N 2/10 |

* cited by examiner

ULTRASONIC PHASED ARRAY TRANSDUCER DEVICE WITH TWO-DIMENSIONAL HINGE ARRAY STRUCTURE

TECHNICAL FIELD

The disclosure belongs to equipment in the technical field of ultrasonic detection, and mainly relates to an ultrasonic phased array transducer device with a two-dimensional hinge array structure.

BACKGROUND

The ultrasonic detection technology is one of the commonly used non-destructive detection methods. The biggest advantage of the ultrasonic detection technology is that it has a very high detection capability for defects such as cracks, interlayers and incomplete penetration. Meanwhile, the ultrasonic detection technology is harmless to the human body, and the equipment is portable and flexible in use, and is suitable for use in various environments such as workshops, fields and underwater space. By virtue of some light-weight mechanical devices, the ultrasonic detection technology can detect the running equipment. In view of the above advantages, the ultrasonic detection technology is widely used in the field of non-destructive detection. With the continuous in-depth research of the ultrasonic detection technology, in order to promote its development towards digitization, automation, intelligence and visualization, the ultrasonic phased array detection technology has emerged. The ultrasonic phased array detection technology has the advantages of large scanning range, high detection speed, high resolution and wide application range. An ultrasonic phased array transducer is a key component of an ultrasonic phased array detection system. Due to the lack of ultrasonic phased array transducers with excellent properties, reliable structures, economy and durability and flexible structures, the wide application of the ultrasonic phased array detection technology is hindered.

In recent years, with the rapid development of the ultrasonic phased array detection technology in the field of industrial detection, the ultrasonic phased array detection technology has received more and more attention and has become a research focus. More and more researchers have conducted in-depth research on ultrasonic phased array transducers. M2 Electronics (Shanghai) Co., Ltd. proposes an area array probe (publication number: CN209542523U). The area array probe includes a positive electrode lead, a negative electrode lead, an electrode array element, a positive electrode layer, a negative electrode layer, a matching layer and a backing material layer. The electrode array element includes a plurality of positive electrode units, a plurality of negative electrode units and insulating material layers, the positive electrode units and the negative electrode units are arranged crosswise at equal intervals from top to bottom, the insulating material layers are distributed in the gaps between the positive electrode units and the negative electrode units, and the positive electrode units, the negative electrode units and the insulating material layers form blocky space. The positive electrode layer is provided with a plurality of separation grooves on the upper surface of the blocky space, and the separation grooves separate the upper surface of the blocky space into a plurality of equivalent rectangular positive electrode layers. The positive electrode lead is connected to the positive electrode layer, and the negative electrode lead is connected to the negative electrode layer. The area array probe is convenient to operate, high in sensitivity, high in integration level, and high in resolution. The problem of this device is that it cannot be applied to detection of workpieces to be detected with curved surfaces or spherical surfaces.

Changsha Fenbei Electronic Technology Co., Ltd. proposes a two-dimensional array ultrasonic probe (publication number: CN206763312U). The two-dimensional array ultrasonic probe includes a matching layer, a first flexible circuit board, a piezoelectric ceramic composite material wafer, a second flexible circuit board, a backing, a third flexible circuit board, an ultrasonic main board and wires. The matching layer is connected to the first flexible circuit board, the first flexible circuit board is connected to the piezoelectric ceramic composite material wafer, the piezoelectric ceramic composite material wafer is connected to the second flexible circuit board, the second flexible circuit board is connected to the backing, the backing is connected to the third flexible circuit board, the third flexible circuit board is connected to the ultrasonic main board, and the ultrasonic main board is connected to the wires. The ultrasonic main board includes a transmitting switching circuit, a receiving switching circuit, an ultrasonic transmitting circuit module, an ultrasonic receiving circuit module, a module, a circuit, a clock distribution circuit and a module. The two-dimensional array ultrasonic probe with a signal switching processing circuit is manufactured by adopting the above technical solution, the hardware requirements of the circuit are reduced, and the two-dimensional array ultrasonic probe has the characteristics of low cost, portability and reliability. The problem of this device is that it cannot be applied to detection of workpieces to be detected with curved surfaces or spherical surfaces.

Shenzhen Shenchao Transducer Co., Ltd. proposes a method for manufacturing an ultrasonic area array probe (two-dimensional ultrasonic area array probe and manufacturing method thereof, publication number: CN107280704A). The two-dimensional ultrasonic area array probe includes a piezoelectric array, a backing material layer, at least one matching layer and a plurality of integrated switch chips. The piezoelectric array includes a plurality of piezoelectric units arranged in an array. The backing material layer is located at the positive side of the piezoelectric array, and is configured to absorb ultrasonic waves emitted from the positive side of the piezoelectric array. The matching layer is located at the negative side of the piezoelectric array, and is configured to match with the acoustic impedance of the human body. Each integrated switch chip is electrically connected to at least two piezoelectric units to perform time-sharing control of the switching-on of the at least two piezoelectric units. The technical solution of the disclosure can reduce the number of output signal channels. The problem of this device is that it cannot be applied to detection of workpieces to be detected with curved surfaces or spherical surfaces.

SUMMARY

At present, most of the ultrasonic phased array transducers on the market are applied to measurement of workpieces to be detected with flat surfaces, and ultrasonic phased array transducers applied to measurement of workpieces to be detected with spherical surfaces are very rare. Therefore, we think of a way to realize the deflection and focusing of ultrasonic sound beams by changing the structure of the ultrasonic phased array transducer and combining with the law of delay, wherein the number of array elements is an odd number, and the array elements are arranged in a shape of the British "Union Jack". The disclosure realizes the deflection and focusing of ultrasonic waves on the basis of a two-dimensional hinge array structure and in combination with the law of delay, has a diverse structure, and can realize the detection of workpieces to be detected with flat surfaces, curved surfaces or spherical surfaces. The purpose of the disclosure is realized as follows:

In an ultrasonic phased array transducer device with a two-dimensional hinge array structure, a fixed support is arranged above, and a connecting rod is fixedly connected to the fixed support and a two-dimensional hinge array respectively. Voice coil motors are symmetrically arranged in a shape of the British "Union Jack" with the connecting rod as a center, and are fixedly connected to the fixed support. One end of each of force output rods is connected to a voice coil motor coil, and the other end is connected to the upper surface of the array unit of the two-dimensional hinge array. Piezoelectric array elements are fixedly connected to the lower surfaces of all units of the two-dimensional hinge array, and are symmetrically arranged in a shape of the British "Union Jack" with the connecting rod as a center. The numbers of the voice coil motors and force output rods are 2N (N=4, 8, 12, 16, 20), the number of the piezoelectric array elements is 2N+1, and different N values are selected according to the sizes of workpieces to be detected.

Compared with the prior art, the disclosure has the following characteristics: In the disclosure, by adjusting the current of each voice coil motor coil, the corresponding force output rod generates displacement to drive the two-dimensional hinge array unit to generate displacement, so as to push out and retract the hinge array unit and the piezoelectric array element fixedly connected below and drive the two-dimensional hinge array to generate deformation, so that the piezoelectric array element fully fits with the surface of the workpiece to be detected. Thus, the disclosure can be applied to detection of the workpieces to be detected with flat surfaces, curved surfaces or spherical surfaces, and can realize the focusing and deflection of the ultrasonic waves in combination with the law of delay.

Figure 1:
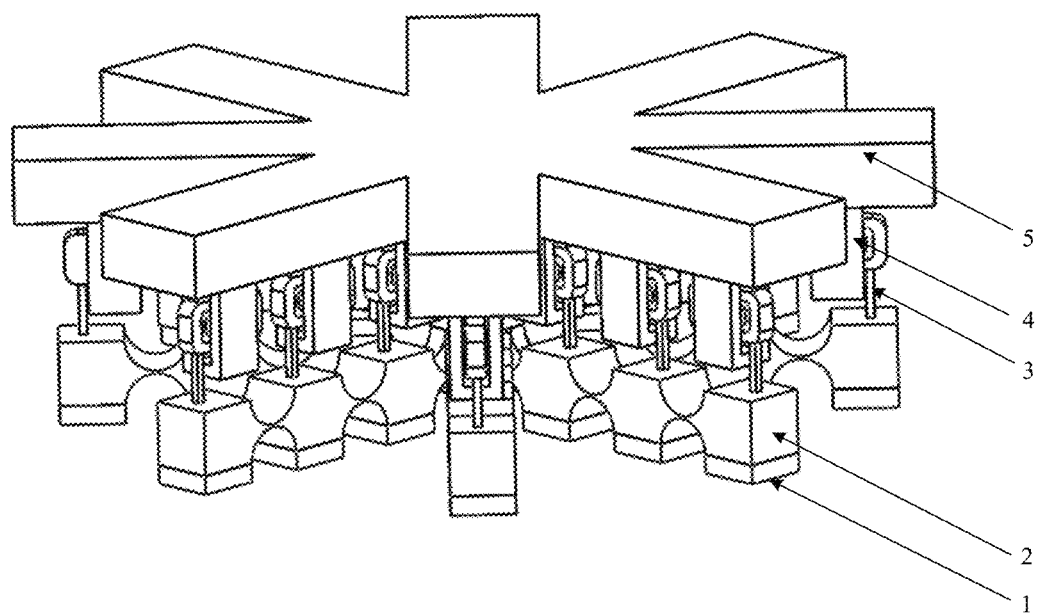
FIG. 1 is a schematic structural diagram of an ultrasonic phased array transducer with a two-dimensional hinge array structure.
Figure 2:
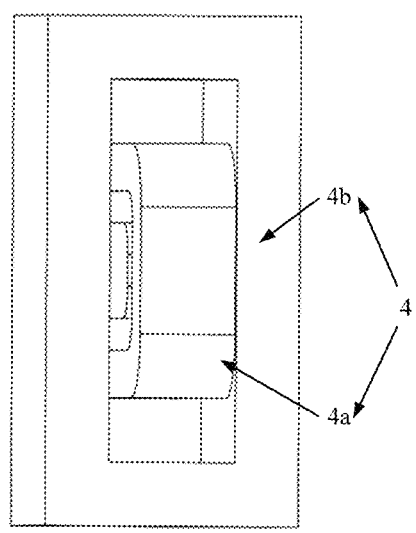
FIG. 2 is a schematic structural diagram of a voice coil motor.
Figure 3:
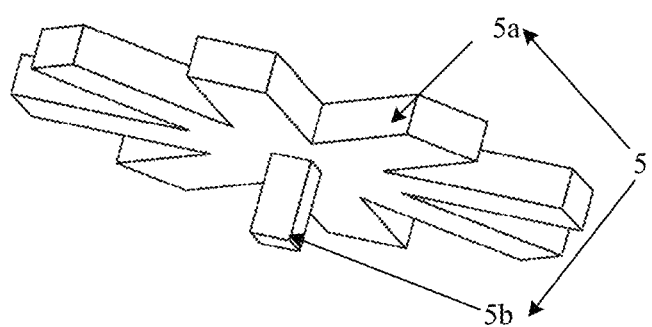
FIG. 3 is a schematic structural diagram of a fixed support.

In the figures: 1 denotes a piezoelectric array element, 2 denotes a two-dimensional hinge array, 3 denotes a force output rod, 4 denotes a voice coil motor, 4a denotes a voice coil motor coil, 4b denotes a voice coil motor magnetic cylinder, 5 denotes a fixed support, 5a denotes a fixed support base, and 5b denotes a fixed support connecting rod.

DETAILED DESCRIPTION

The disclosure will be further described in detail below with reference to the drawings: In an ultrasonic phased array transducer device with a two-dimensional hinge array structure, one end of a connecting rod 5b is fixedly connected to the center position of a fixed support base 5a, and the other end is connected to a center array unit of a two-dimensional hinge array 2. Voice coil motors 4 are symmetrically arranged in a shape of the British "Union Jack" with the connecting rod 5b as a center, and are fixedly connected to the fixed support base 5a. One end of each of force output rods 3 is connected to a voice coil motor coil 4a, and the other end is connected to the upper surface of the array unit of the two-dimensional hinge array 2. Piezoelectric array elements 1 are fixedly connected to the lower surfaces of all the units of the two-dimensional hinge array 2. According to the curvature of the surface of a workpiece to be detected, currents in the voice coil motor coils 4a are respectively controlled to make the voice coil motor coils 4a subject to the action of a magnetic field force, so as to drive the force output rods 3 to move to generate displacement and drive the two-dimensional hinge array 2 to generate deformation, and finally, the piezoelectric array elements 1 fully fit with the surface of the workpiece to be detected. After the detection, the currents in the voice coil motor coils 4a are reversed, the magnetic field force acting on the voice coil motor coils 4a is reversed, and the force output rods 3 drive the two-dimensional hinge array 2 and the piezoelectric array elements 1 back to initial positions for the next detection.

What is claimed is:

1. An ultrasonic phased array transducer device, comprising
    a support base with arms radially extending from a center position of the support base,
    voice coil motors, and
    a two-dimensional hinge array with piezoelectric array elements,
    wherein the arms are rotationally symmetrical with respect to the center position;
    wherein the voice coil motors are connected to the arms;
    wherein each of the voice coil motors comprises a force output rod and a coil, one end of the force output rod is connected to the coil, and the other end of the force output rod is connected to a first surface of the two-dimensional hinge array;
    wherein the piezoelectric array elements are connected to a second surface of the two-dimensional hinge array, opposite from the first surface;
    wherein the voice coil motors are configured to individually displace the force output rods, thereby deforming the two-dimensional hinge array and engaging the piezoelectric array elements with a surface of a workpiece.

2. The ultrasonic phased array transducer device of claim 1, further comprising a connecting rod, wherein one end of the connecting rod is connected to and extends axially from the center position of the support base, and the other end of the connecting rod is connected to the two-dimensional hinge array.

* * * * *